June 9, 1959
D. J. COLE
2,889,757
MACHINE TOOL VISE
Filed July 16, 1957
2 Sheets-Sheet 1
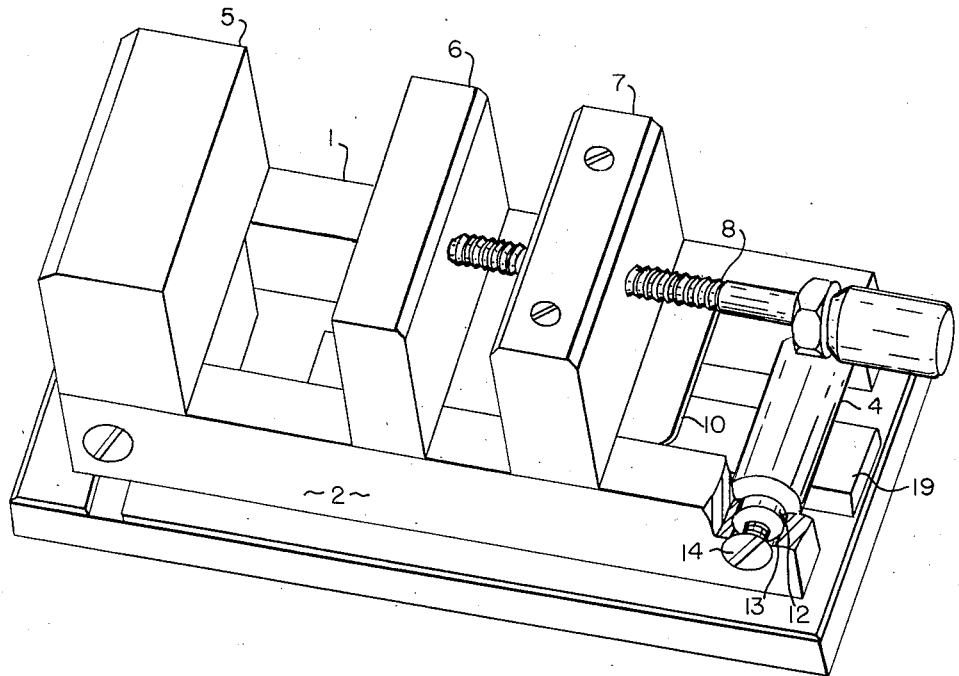
Fig. I
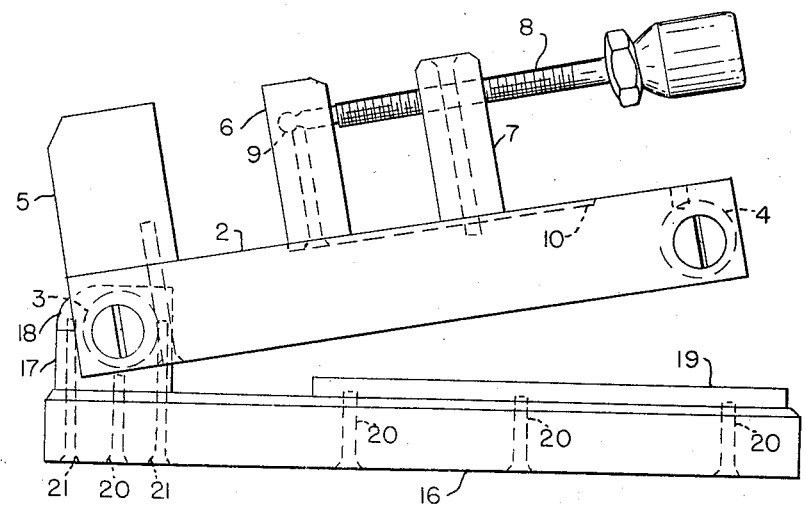
Fig. II
INVENTOR.
DERRILL J. COLE
BY
Marshall, Marshall & Yeasting
ATTORNEYS June 9, 1959
D. J. COLE
2,889,757
MACHINE TOOL VISE
Filed July 16, 1957
2 Sheets-Sheet 2
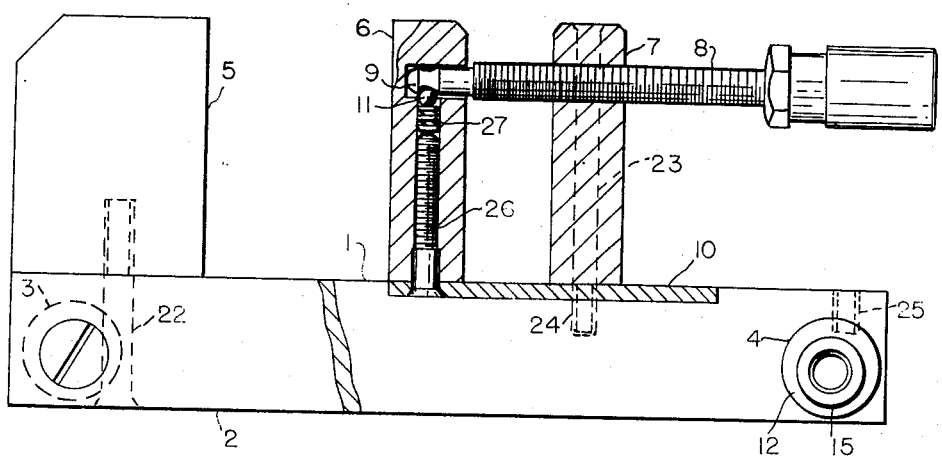
Fig. III
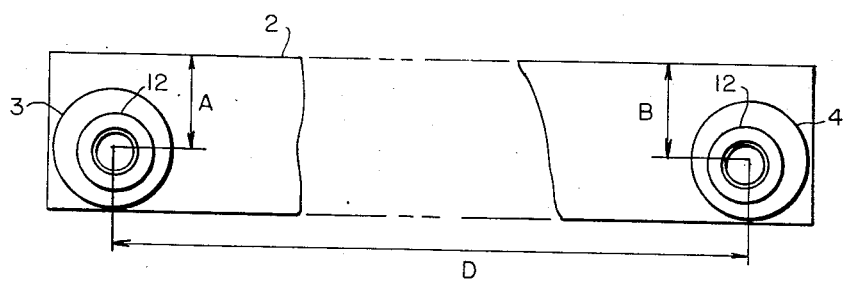
Fig. IV
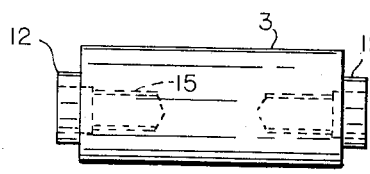
Fig. V
INVENTOR.
DERRILL J. COLE
BY
Marshall, Marshall & Yeasting
ATTORNEYS

# United States Patent Office 2,889,757
Patented June 9, 1959

2,889,757

MACHINE TOOL VISE

Derrill J. Cole, Hicksville, Ohio

Application July 16, 1957, Serial No. 672,186

4 Claims. (Cl. 90—60)

This invention relates to machine tool accessories and in particular to a vise for use in machine tools for holding work in precisely determined positions.

Accessory devices for use in machine tools are furnished by many machine tool manufacturers. These include vises for use on drill presses, grinding machines, milling machines and similar apparatus, some of which vises are provided with tilting mechanisms so that the work may be positioned at an angle with respect to the bed or table of the machine tool. When very precise work must be done on a machine tool the vises that are used to hold the work must be adjusted by means of other measuring equipment in order to position the work in the proper relation to the cutter of the machine tool. Furthermore it is necessary that the parts of the vise and the associated equipment be kept scrupulously clean and free from chips so that the accuracy of location of the parts will not be impaired by such machining chips or by other foreign material. The ordinary machine tool vise is difficult to clean thoroughly to ensure that all of the chips and other waste material from the machining operations are kept out of the working parts of the vise.

The principal object of this invention is to provide a machine tool vise that may be precisely adjusted without the aid of elaborate measuring equipment and which may be easily maintained in a clean accurate condition.

Another object of the invention is to provide a machine tool vise that may be readily disassembled for cleaning purposes.

Another object of the invention is to provide a machine tool vise which may be easily constructed of parts capable of being manufactured to very precise dimensions and assembled and adjusted to correspondingly precise dimensions.

Another object of the invention is to provide a machine tool vise and base which may be used in the manner of a sine bar for holding work at precisely defined angles.

An ancillary object of the invention is to provide a construction for a machine tool vise such that the angle determining portions of the structure may be adjusted to precise dimensions.

These and more specific objects and advantages may be realized in a machine tool vise constructed according to the invention.

According to the invention the improved machine tool vise comprises a pair of side rails held in spaced apart, parallel alignment by a pair of cylindrical struts; a fixed vise jaw and a screw block fixedly mounted on the side rails; and a movable jaw which includes a tail portion sliding between the side rails and extending under the screw block through which a vise tightening screw is threaded for adjusting the position of the movable jaw. The spacing between the cylindrical struts and the distance from the struts to the surface of the side rails is very accurately maintained so that when the vise is mounted on a base with one of the struts held in a cylindrical bore and the other spaced a known distance from a base rail in the base the angle between the base and the side rails may be very accurately determined from the known spacing of the struts and the height of the free strut above the base rail. The spacing between the struts and their distance from the work surfaces of the side rails are adjustable by rotating the struts to turn their eccentrically located tenons engaged in bores in the side rails. Selective rotation of the struts provides adjustment both of the spacing between the struts and the parallelism between the centers of the struts and the work surface of the rails.

A preferred embodiment of the invention is illustrated in the accompanying drawings.

In the drawings:

Fig. I is a perspective view with parts broken away showing the improved machine tool vise mounted on its base.

Fig. II is a side elevation of the vise with the side rails inclined at a small angle to the base.

Fig. III is a side elevation with parts broken away and parts shown in section to illustrate the details of construction of the machine tool vise.

Fig. IV is a fragmentary side elevation, in the nature of a diagram, to illustrate the method of adjustment of the distance between the struts and the parallelism of the line of centers of the struts with the working surface of the side rails.

Fig. V is a plan view of one of the struts illustrating its construction whereby concentrated stresses are avoided when the strut is assembled into the side rails.

These specific figures and the accompanying description are intended merely to illustrate the invention and not to impose limitations on its scope.

A machine tool vise constructed according to the invention comprises a pair of side rails 1 and 2 that are held in spaced parallel alignment by a pair of cylindrical struts 3 and 4. The side rails carry a fixed vise jaw 5, a movable vise jaw 6 and a screw block 7, the fixed vise jaw 5 and the screw block 7 being rigidly attached to the side rails 1 and 2 with the movable vise jaw 6 slidable on the rails intermediate the fixed jaw 5 and the screw block 7. The position of the movable vise jaw 6 is controlled by a vise screw 8 that is threaded through the screw block 7 and has its ball-shaped end 9 (Figs. II and III) engaged in a socket in the movable vise jaw 6. The movable vise jaw 6 is guided by a tail piece 10 that is slidingly fitted between the side rails 1 and 2 and that extends beneath the screw block 7 to prevent the vise jaw from tipping forward as it is advanced toward the fixed jaw 5 by rotation of the screw 8. A ball detent 11 in the movable jaw 6 provides a separable coupling between the jaw and the vise screw 8.

In this structure the side rails 1 and 2 are preferably rectangular parallelopipeds and can be finished by well known machine lapping processes to a very high degree of accuracy both for parallelism between the sides and for squareness between the sides and the upper and lower surfaces. These members may, if desired, be manufactured to an accuracy comparable to gage blocks.

The struts 3 and 4 that hold the side rails in spaced parallel alignment are accurately machined cylinders provided with short tenons 12 (see also Fig. V) extending from their ends and adapted to fit closely in bores 13 in the side rails 1 and 2. If the vise is to be used without a base merely for holding work pieces squarely on a machine tool table the spacing between the struts 3 and 4 need not be precise and therefore the tenons 12 may be concentric with the axes of the struts 3 and 4. However, if the vise is to be part of an angle determining assembly it is necessary for convenient, accurate determination of the angle that the spacing between the struts 3 and 4 be adjusted to an exact whole number. To accomplish this added feature the tenons 12 are made eccentric with respect to the cylindrical surfaces of the struts 3 and 4 in an amount approximately equal to the expected error in spacing between the bores 13 in the side rails 1 and 2 and are rotated to correct the spacing of the struts.

The struts are held in the side rails 1 and 2 by screws 14, the heads of which are countersunk into the ends of the bores 13 and the threaded portions of which are threaded into holes 15 drilled and tapped into the cylindrical struts 3 and 4 in line with the axis of the tenons 12. As may be seen in Fig. V the ends of the tenons are counterbored to a depth greater than the length of the tenon and the drilled hole 15 extending toward the center of the strut is then tapped from the bottom of the counterbore nearly to the bottom of the hole to take the screw 14. No threads are provided in the counterbored portion in the tenon so that there is no possibility of stresses or strains set up in the tenons themselves that would tend to affect the spacing of the struts with respect to each other and the side rail work surface.

When the vise is to be used as a sine bar fixture in precisely determining angles the vise is mounted on a base 16 (Fig. II) that includes a bearing block 17 having a bore to accurately receive one of the struts 3 or 4. The bearing block 17 is split parallel to the base so that its upper portion 18 may be removed to allow removal of the vise without disturbing the position of the lower portion of the bearing block 17 with respect to the base 16. A base rail 19 mounted on the upper surface of the base 16 is of a thickness such that its upper surface is parallel to the surface of the base 16 and is precisely tangent to the lower portion of the bore in the bearing block 17. The bearing block 17 and base rail 19 are preferably attached to the base 16 by means of screws 20 passing upwardly through holes in the base 16 and threaded into the lower part of the bearing block 17 and the base rail 19. Other screws 21 extending upwardly through holes in the base 16 and the lower portion of the bearing block 17 are threaded into tapped holes in the upper portion 18 of the bearing block 17.

The improved vise assembled on its base 16 constitutes in effect a sine bar fixture since the distance between the struts 3 and 4, the hypotenuse of the right angle triangle, is known to an exact dimension and the height of the strut 4 above the base rail 19 may be set or measured to a precise dimension by means of gage blocks inserted therebetween. From these known dimensions and a table of trigonometric functions the angle between the side rails 1 and 2 and the base 16 may be very accurately determined. With ordinary care in the manufacture and adjustment of the various parts of the vise and its base the error in angular measurement should not exceed fifteen seconds of arc.

Referring now to Fig. IV, the precise positioning or spacing of the struts 3 and 4 from each other is accomplished by selective rotation of the struts. Such rotation shifts the center lines of the cylindrical portions of the struts 3 or 4 about the axis of the bores 14 in circular paths determined by the eccentricity of the tenons 12. As illustrated in Fig. IV the center to center distance of the bores 13 in the side rail 1 or 2 is slightly less than the desired center to center distance for the struts 3 and 4. Likewise the bores 13 to receive the tenons 12 are located nearly equidistantly from the upper or work surface of the side rails 1 and 2 so that the struts 3 and 4 have their center lines substantially parallel to the surface of the side rail. In this case the struts are angularly positioned so that the center of the strut 3, as indicated by intersection of the witness lines for the dimensions A and D, lies upwardly and to the left of the center of the bore 13 or tenon 12. Likewise, the strut 4 is angularly positioned so that its axis lies upwardly and to the right of the axis of the tenon 12. With the struts angularly positioned as shown the center to center distance of the struts, the dimension D, may be reduced by rotating the strut 3 clockwise and the strut 4 counterclockwise thus bringing the centers closer together. Reversal of the rotation will spread the centers. The equality of the dimensions A and B, the distance from the upper or work surface of the rail 2 to the center line of the cylindrical struts 3 and 4 may be maintained and adjusted by selective rotation of the struts. Thus, if dimension A is greater than dimension B thus indicating that strut 3 must have its center raised with respect to strut 4, both struts would be rotated clockwise thus decreasing dimension A and increasing dimension B. The relative amounts of rotation must be selected so that the dimension D is not changed during this adjustment. As ordinarily constructed the eccentricity of the tenons 12 of the struts 3 and 4 is made approximately five thousandths of an inch so that a maximum error of five thousandths inch in the distance between the center lines of the bores 13 may be corrected.

If the distances between the bores 13 should by chance be precisely equal to the desired dimension D and at the same time the dimensions from the upper surface of the rail 2 to the center line of the bores 13 be in error it is possible by means of the eccentric tenons on each of the struts 3 and 4 to bring the struts into precise spacing and alignment. This is done by rotating the struts until their eccentricities are to the same side of the vertical axes through the tenons 12 and displacing one above and one below a horizontal line through the centers of bores 13 in substantially equal amounts to correct the error in the dimensions A and B. Putting the eccentricities to the same side of the vertical line in effect cancels out the eccentricity as far as the interstrut spacing is concerned. This combination of eccentricities permits errors in positioning of the bores to be corrected as long as the total error does not amount to more than double the eccentricity of one of the tenons in the struts.

The details of construction of the movable vise jaw 6 and the screw block 7 whereby the movable jaw 6 may be readily removed from the side rails 1 and 2 for cleaning is illustrated in greater detail in Fig. III. As shown in this figure the fixed vise jaw 5 is rigidly attached to the side rails 1 and 2 by bolts 22 extending upwardly through the side rails 1 and 2 and threaded into the fixed jaw 5. The screw block 7 likewise is attached to the side rails 1 and 2 by long screws 23 that, extending downwardly from the top of the block, engage either tapped holes 24 or 25 depending upon the desired position of the screw block on the rails. The tail piece 10, that serves as a guide for the movable jaw 6, is rigidly attached to the vise jaw 6 by a screw 26 that also serves to compress a spring 27 forming part of the ball detent 11 engaging the vise screw 8.

The tail piece 10, which is a sliding fit between the side rails 1 and 2, passes beneath the screw block 7 and is thin enough to pass between that block and the cylindrical strut 4 when the block is mounted in its right hand position at the ends of the side rails.

When it is necessary to remove the movable vise jaw 6 for cleaning purposes it is only necessary to back off the vise screw 8 and then disengage the ball end 9 of the screw from the ball detent 11 and lift the movable jaw 6 together with its tail piece 10 out of the space between the fixed jaw 5 and the screw block 7. This opens up this entire area for cleaning and since there are no V-grooves or dovetailed ways for the jaws all parts may be very easily cleaned and kept in an accurate true condition.

The improved vise is particularly easy to construct to a high degree of accuracy because all of the parts that contribute to the accuracy of the vise are simple shapes that can be manufactured by grinding and lapping processes to a high degree of accuracy.

The location of the vise screw 8 at a substantial distance above the working surface of the side rails 1 and 2 and near the top of the movable vise jaw 6 provides an advantage in that the center of pressure of the work clamped between the fixed jaw 5 and the movable jaw 6 is located between the screw 8 and the side rails 1 and 2. This causes the upper portion of the movable jaw 6 to tend to tip toward the fixed jaw 5 as pressure is applied by the screw 8. This tipping force is resisted both by the work being clamped and by the tail piece 10 engaging the undersurface of the screw block 7. This particular arrangement keeps the movable jaw 6 firmly in contact with the side rails 1 and 2 thus minimizing any tendency for the work or jaws to spring upwardly away from the side rails 1 and 2 when the jaws are tightened on the work.

These specific figures and the accompanying description are intended merely to illustrate the invention and not to impose limitations on its scope.

Having described the invention, I claim:

1. In a device of the class described, in combination, a base, a split bearing on the base near an end thereof, a base rail on the base with its surface parallel to the surface of the base and tangent to the lower part of the bore in said bearing, a pair of side rails, a pair of cylindrical struts one engaged in said split bearing for interconnecting and holding the side rails in spaced parallel alignment, said struts being accurately spaced from each other and at least one having eccentric tenons engageable in transverse bores in the side rails and being rotatably adjustable in said side rail bores, whereby the line of centers of the struts may be adjusted to exact parallelism with the side rails and the elevation of one of the struts above said base rail used as a measure of the angle between the base and side rails.

2. In a device of the class described, in combination, a base, a base rail on the base with its surface elevated above and lying parallel to the base, a split bearing on the base with the lower surface of its bore tangent to the plane of the surface of the rail, a pair of side rails, a cylindrical strut engageable in said split bearing, a second cylindrical strut, each of said struts having eccentric tenons extending from its ends, said side rails having transverse bores for receiving the tenons, said bores being substantially equally spaced from a first surface of said side rails and spaced apart a distance that differs from a desired strut spacing by not more than the eccentricity of the tenons in the struts, said struts being rotatably adjustable whereby the spacing of the struts from each other and from the first surface of the side rails may be adjusted to bring the line of centers of the struts to a precise length and into parallelism with the first surface of the rails, whereby the inclination of the rails with respect to the base may be determined from said precise length and the distance from the second strut to the base rail.

3. In a device of the class described, in combination, a base, a base rail on the base having its surface parallel to the opposite surface of the base, a split bearing block on the base, said bearing block having a bore that is tangent to the plane of the base rail surface, and a tiltable rail assembly comprising a pair of side rails joined by a pair of equal transverse cylindrical struts one of which is rotatably journaled in the bearing block and the other free, said struts being adjustable to a precise distance from each other and equally distant from a surface of the side rails, whereby the inclination of the side rail surface with respect to the base may be precisely determined from the distance between the struts and the distance from the free strut to the base rail surface.

4. In a device of the class described, in combination, a base having a plane surface, a base rail and a bearing block having a transverse bore mounted on the base with the plane of the surface of the base rail tangent to the transverse bore and parallel to the plane surface of the base, and a tiltable rail assembly, said rail assembly comprising a pair of side rails, a pair of cylindrical struts one of which is journaled in the bore of the bearing block for holding the side rails in spaced alignment, and means for adjusting the struts longitudinally and laterally of the side rails.

References Cited in the file of this patent

UNITED STATES PATENTS

| | | |
|---|---|---|
| 438,826 | Randall | Oct. 21, 1890 |
| 895,953 | Brewer | Aug. 11, 1908 |
| 1,114,970 | Cumner | Oct. 27, 1914 |
| 1,425,275 | Paulsen | Aug. 8, 1922 |
| 2,014,156 | Verderber | Sept. 10, 1935 |
| 2,345,708 | Lines | Apr. 4, 1944 |
| 2,480,415 | Mettler | Aug. 30, 1949 |
| 2,649,785 | Sirko | Aug. 25, 1953 |
| 2,764,047 | Allbritton | Sept. 25, 1956 |
| 2,765,538 | Field | Oct. 9, 1956 |